(12) United States Patent
Hixenbaugh

(10) Patent No.: US 8,894,510 B2
(45) Date of Patent: Nov. 25, 2014

(54) GOLF BALL DIMPLE PROFILE

(71) Applicant: Acushnet Company, Fairhaven, MA (US)

(72) Inventor: Chris Hixenbaugh, Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 146 days.

(21) Appl. No.: 13/731,925

(22) Filed: Dec. 31, 2012

(65) Prior Publication Data

US 2014/0187355 A1 Jul. 3, 2014

(51) Int. Cl.
*A63B 37/12* (2006.01)
*A63B 37/14* (2006.01)
*A63B 37/00* (2006.01)
*G01B 5/20* (2006.01)

(52) U.S. Cl.
CPC ......... *A63B 37/0012* (2013.01); *A63B 37/0019* (2013.01); *G01B 5/20* (2013.01)
USPC .......................................... 473/384; 473/383

(58) Field of Classification Search
CPC .................... A63B 37/0012; A63B 37/0019
USPC .............................................. 473/378–384
See application file for complete search history.

(56) References Cited

U.S. PATENT DOCUMENTS

| | | | | |
|---|---|---|---|---|
| 4,681,323 A | * | 7/1987 | Alaki et al. ................. | 473/384 |
| 5,857,924 A | * | 1/1999 | Miyagawa et al. ........... | 473/365 |
| 6,039,660 A | * | 3/2000 | Kasashima et al. .......... | 473/378 |
| 6,796,912 B2 | * | 9/2004 | Dalton et al. ................. | 473/383 |
| 7,163,472 B2 | * | 1/2007 | Dalton et al. ................. | 473/383 |
| 7,641,572 B2 | * | 1/2010 | Aoyama et al. .............. | 473/383 |
| 8,079,921 B2 | * | 12/2011 | Sato et al. ................... | 473/383 |
| 8,137,217 B2 | * | 3/2012 | Madson et al. .............. | 473/383 |
| 8,337,334 B2 | * | 12/2012 | Goodwin .................... | 473/384 |
| 8,632,426 B2 | * | 1/2014 | Madson et al. .............. | 473/383 |
| 2003/0114255 A1 | * | 6/2003 | Dalton et al. ................ | 473/384 |
| 2004/0198537 A1 | * | 10/2004 | Dalton et al. ................ | 473/384 |
| 2005/0043119 A1 | * | 2/2005 | Veilleux et al. .............. | 473/383 |
| 2010/0081519 A1 | * | 4/2010 | Aoyama et al. .............. | 473/384 |
| 2010/0240474 A1 | * | 9/2010 | Madson et al. .............. | 473/384 |
| 2011/0195802 A1 | * | 8/2011 | Nakamura et al. ........... | 473/384 |
| 2012/0122613 A1 | * | 5/2012 | Madson ....................... | 473/384 |
| 2012/0165130 A1 | * | 6/2012 | Madson et al. .............. | 473/384 |
| 2012/0178551 A1 | * | 7/2012 | Madson et al. .............. | 473/384 |
| 2013/0172123 A1 | * | 7/2013 | Nardacci et al. ............. | 473/383 |
| 2013/0172124 A1 | * | 7/2013 | Hixenbaugh et al. ........ | 473/383 |
| 2013/0172125 A1 | * | 7/2013 | Nardacci et al. ............. | 473/383 |
| 2013/0172126 A1 | * | 7/2013 | Madson et al. .............. | 473/384 |
| 2013/0172127 A1 | * | 7/2013 | Hixenbaugh et al. ........ | 473/384 |
| 2014/0135147 A1 | * | 5/2014 | Madson et al. .............. | 473/383 |
| 2014/0187355 A1 | * | 7/2014 | Hixenbaugh ................ | 473/383 |

* cited by examiner

*Primary Examiner* — Gene Kim
*Assistant Examiner* — Matthew B Stanczak
(74) *Attorney, Agent, or Firm* — Mandi B. Milbank

(57) ABSTRACT

Golf ball dimples having a cross-sectional profile shape defined by the envelope of the response of an under damped harmonic oscillator are disclosed.

2 Claims, 12 Drawing Sheets

GOLF BALL DIMPLE PROFILE

FIELD OF THE INVENTION

The present invention relates to a golf ball dimple cross-sectional profile based on the envelope of the response of an under damped harmonic oscillator.

BACKGROUND OF THE INVENTION

Golf ball dimples are known to have a significant effect on the aerodynamic forces acting on the ball during flight. For example, the dimples on a golf ball create a turbulent boundary layer around the ball. The turbulence energizes the boundary layer and helps it stay attached further around the ball to reduce the area of the wake. This greatly increases the pressure behind the ball and substantially reduces the drag. Based on the significant role that dimples play in golf ball design, manufacturers continually seek to develop novel dimple patterns, sizes, shapes, volumes, cross-sections, etc. Thus, the present invention provides a novel dimple cross-sectional profile having unique aesthetic and aerodynamic characteristics.

SUMMARY OF THE INVENTION

In one embodiment, the present invention is directed to a method for defining a golf ball dimple surface. The method comprises providing a response of an under damped harmonic oscillator, wherein the response has an envelope of oscillation described according to the equations disclosed herein; defining a golf ball dimple profile based on the positive or negative solution of the envelope of oscillation for a time equal to one half of the dimple diameter; and rotating the dimple profile 360° about the vertical axis to define the dimple surface.

In another embodiment, the present invention is directed to a golf ball having a plurality of recessed dimples on the surface thereof, wherein at least a portion of the recessed dimples have a surface defined by the envelope of a response of an under damped harmonic oscillator.

BRIEF DESCRIPTION OF DRAWINGS

In the accompanying drawings, which form a part of the specification and are to be read in conjunction therewith, and which are given by way of illustration only, and thus are not meant to limit the present invention.

DETAILED DESCRIPTION

Golf balls of the present invention include dimples having a cross-sectional profile defined by the envelope of the response of an under damped harmonic oscillator.

Figure 1:
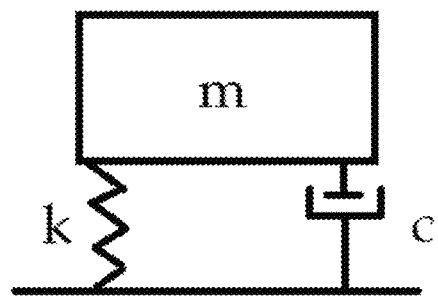
FIG. 1 shows a damped harmonic oscillator.
Figure 2:
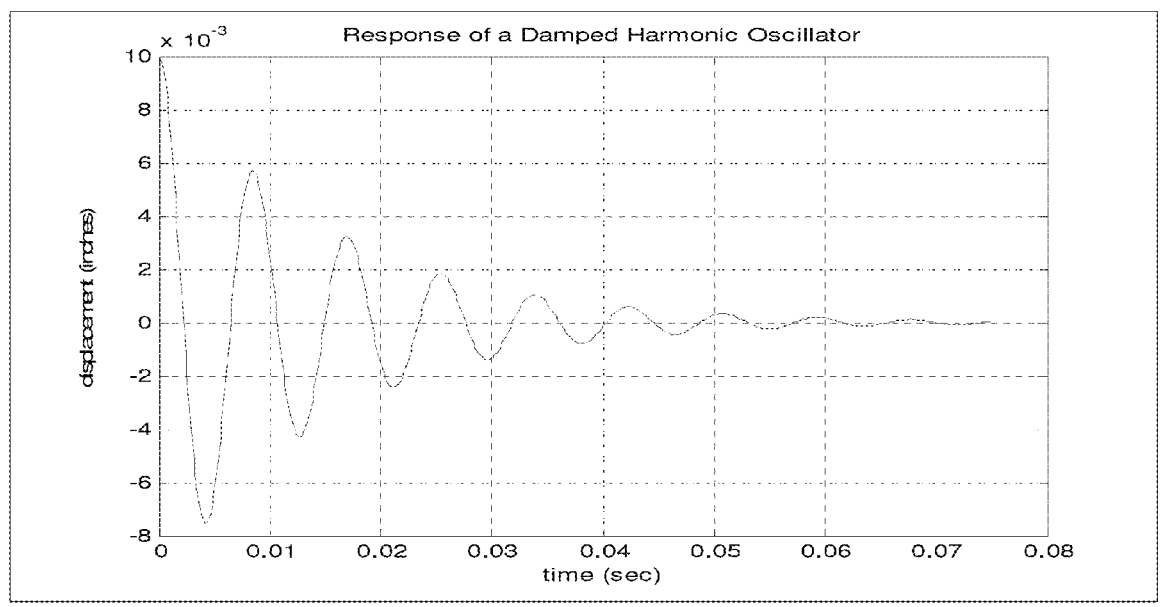
FIG. 2 shows a response of the system illustrated in FIG. 1, according to an embodiment of the present invention.

FIG. 1 shows a damped harmonic oscillator including a mass m, a spring constant k, and a viscous damping coefficient c. A response of the system illustrated in FIG. 1 is shown in FIG. 2 and described by Equation 1 below.

$$x(t) = Xe^{-\zeta\omega_n t} \sin[(1-\zeta^2)^{1/2}\omega_n t + \Phi], \quad \text{Equation 1}$$

where t is time, v is velocity, m is mass, k is the spring constant, c is the viscous damping coefficient, and $$\zeta = \frac{c}{\sqrt{4mk}}, \quad \text{Equation 2}$$

$$\omega_n = \sqrt{\frac{k}{m}}, \quad \text{Equation 3}$$

$$\omega_d = \omega_n\sqrt{1-\zeta^2}, \quad \text{Equation 4}$$

$$X = \frac{[(x_0\omega_d)^2 + (v_0 + \zeta\omega_n x_0)^2]^{1/2}}{\omega_d}, \text{ and} \quad \text{Equation 5}$$

$$\Phi = \tan^{-1}\left(\frac{x_0\omega_d}{v_0 + \zeta\omega_n x_0}\right). \quad \text{Equation 6}$$

Figure 3:
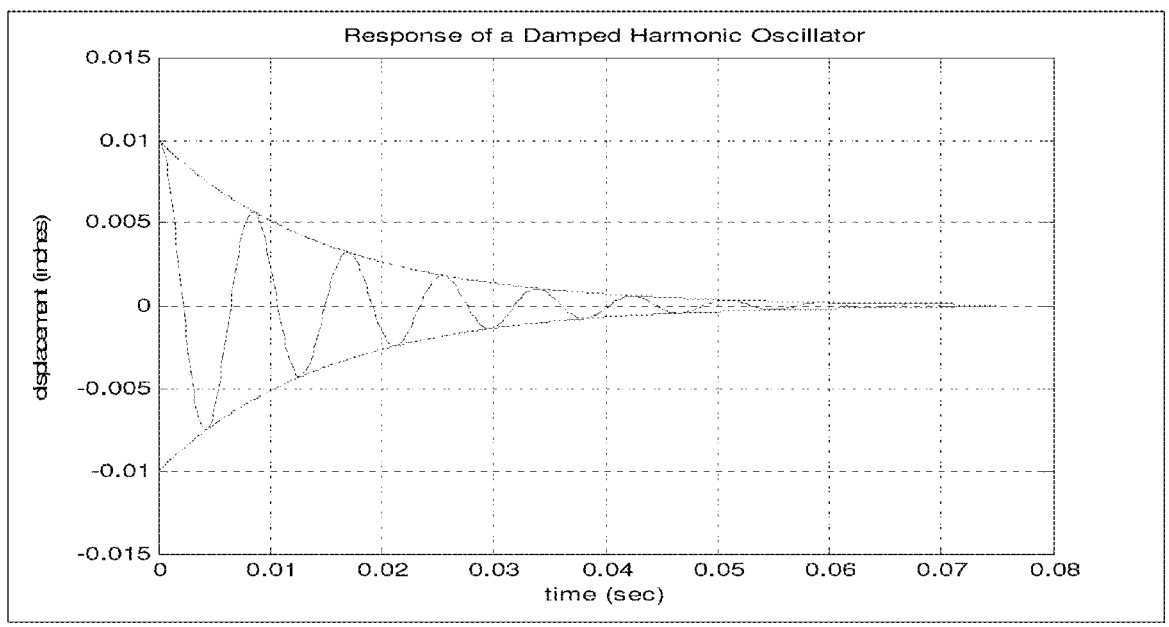
FIG. 3 shows the envelope of oscillation of the oscillatory motion shown in FIG. 2.

The oscillatory motion of an under damped harmonic oscillator can also be described by the envelope of oscillation, as shown in FIG. 3. The envelope of oscillation, OE, is described by Equation 7 below.

$$OE(t) = \pm Xe^{-\zeta\omega_n t}. \quad \text{Equation 7}$$

Either the positive or negative solution of the envelope of oscillation may be manipulated to define the dimple profile. To manipulate the envelope of oscillation to define a dimple profile, the time window of oscillatory motion observation is equal to one half of the dimple diameter.

To define a dimple profile using the envelope of the response of an under damped harmonic oscillator, Equation 7 is manipulated to Equation 8 below.

$$OE(x) = \pm Xe^{-\zeta\omega_n x} \quad \text{Equation 8}$$

where x ranges from zero to one half of the dimple diameter.

The edge angle, chord depth, volume, and curvature of the dimple profile can be manipulated by adjusting the mass, spring constant, viscous damping coefficient, time window, and initial velocity parameters for the under damped harmonic oscillator.

Figure 4:
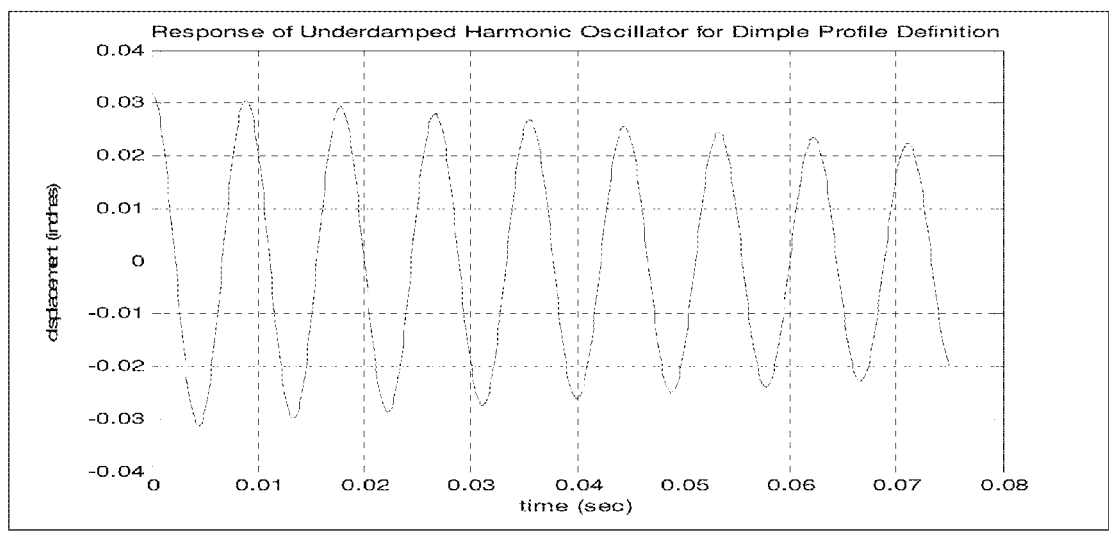
FIG. 4 shows a response of the system illustrated in FIG. 1, according to an embodiment of the present invention.
Figure 5:
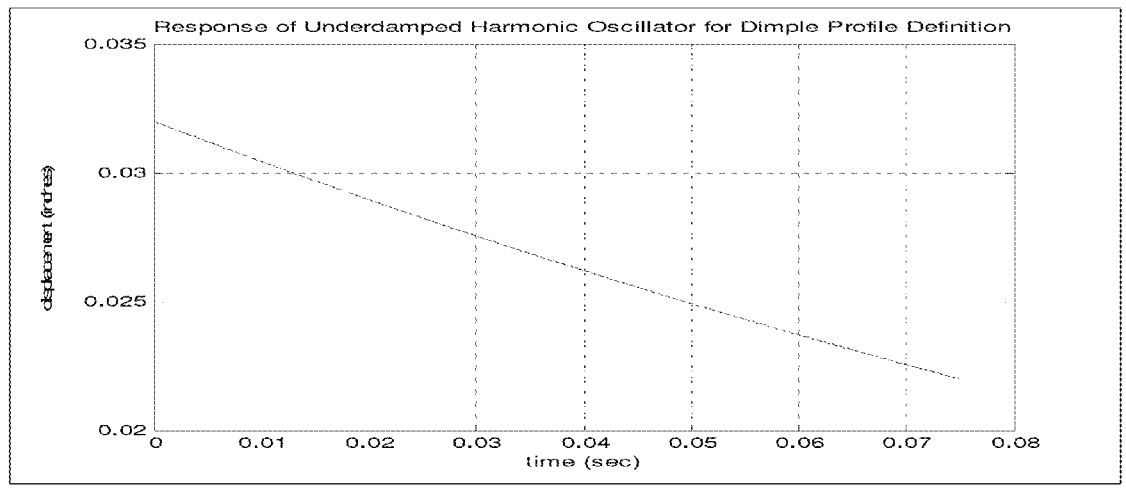
FIG. 5 shows the envelope of oscillation of the oscillatory motion shown in FIG. 4.
Figure 6:
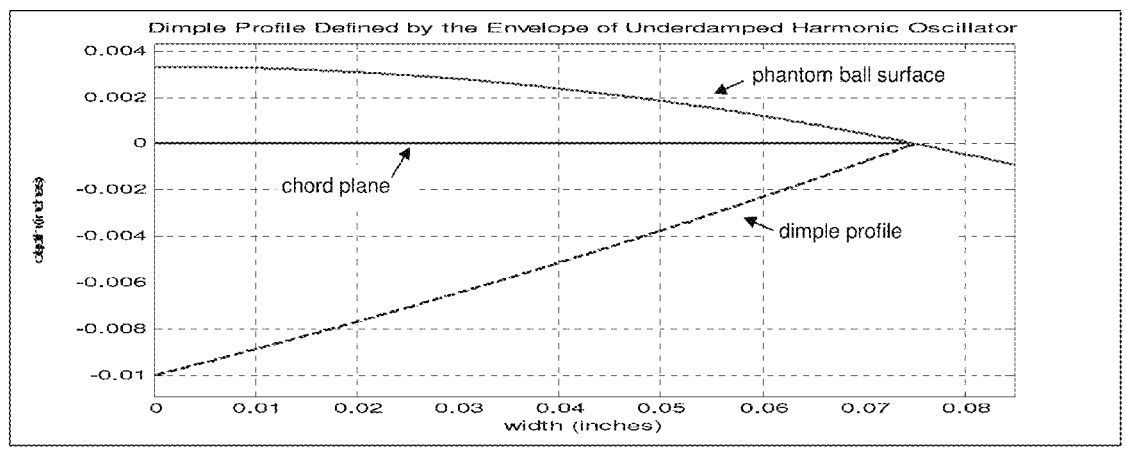
FIG. 6 shows a dimple cross-sectional profile defined using the envelope of oscillation of FIG. 5.
Figure 7:
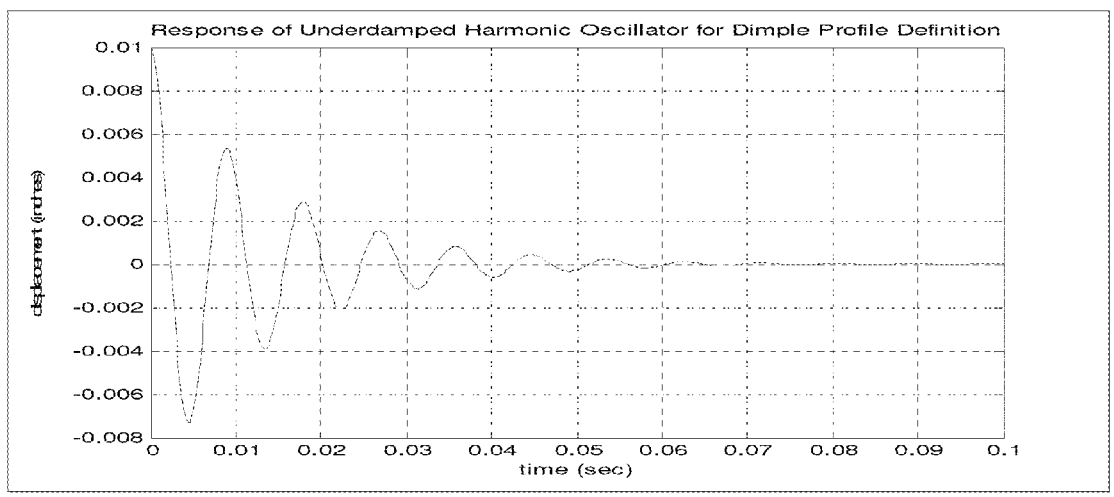
FIG. 7 shows a response of the system illustrated in FIG. 1, according to an embodiment of the present invention.
Figure 8:
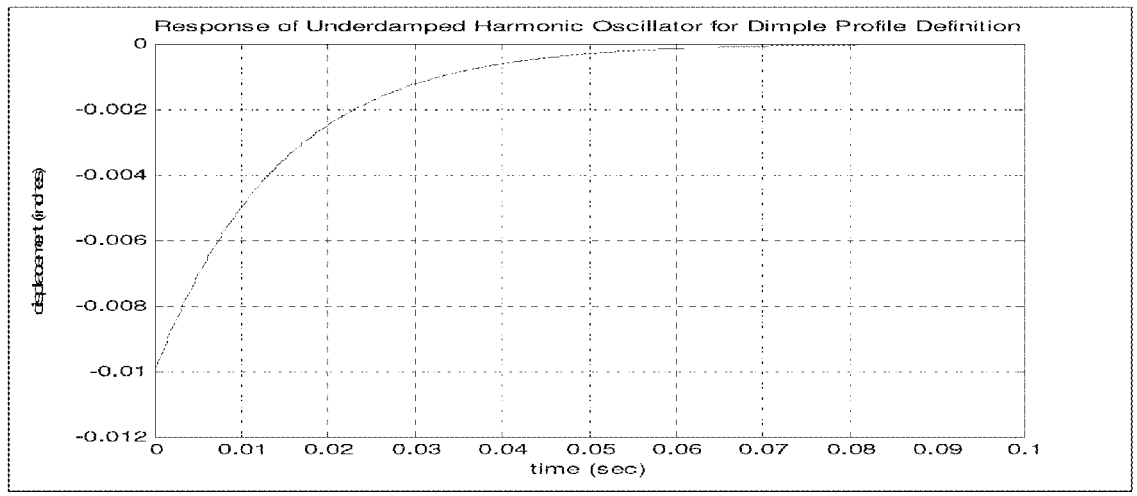
FIG. 8 shows the envelope of oscillation of the oscillatory motion shown in FIG. 7.
Figure 9:
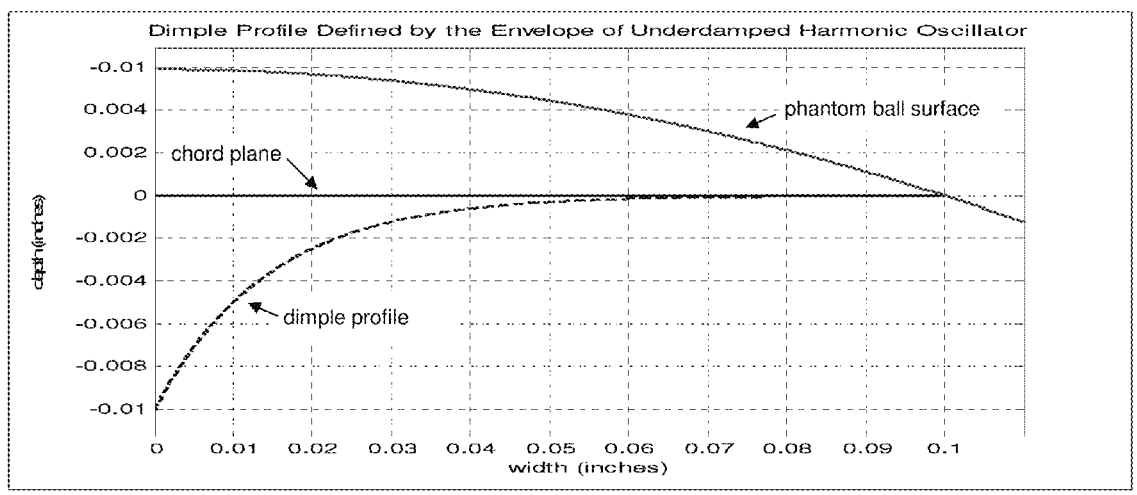
FIG. 9 shows a dimple cross-sectional profile defined using the envelope of oscillation of FIG. 8.
Figure 10:
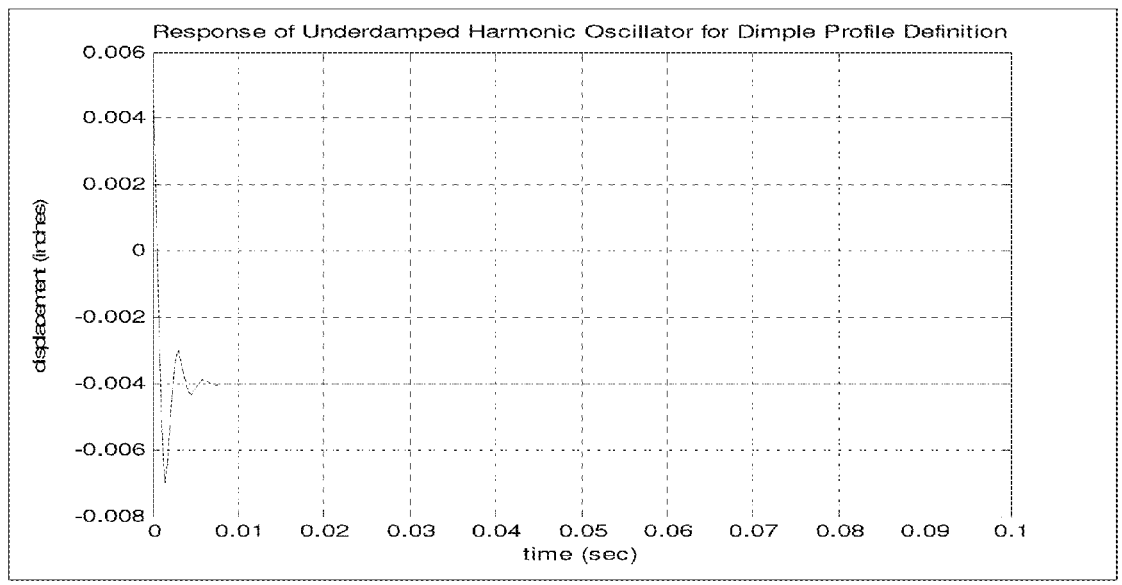
FIG. 10 shows a response of the system illustrated in FIG. 1, according to an embodiment of the present invention.
Figure 11:
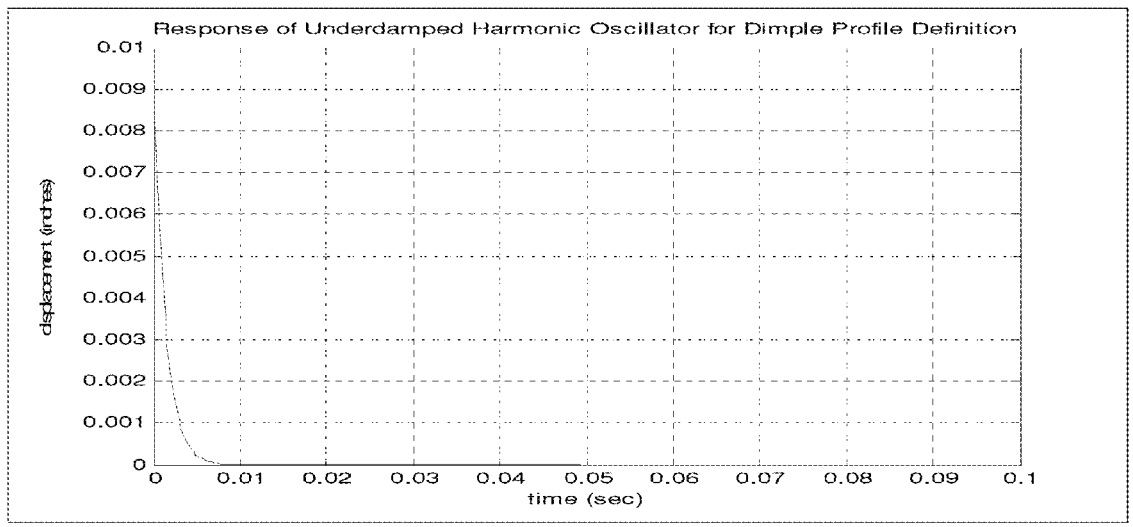
FIG. 11 shows the envelope of oscillation of the oscillatory motion shown in FIG. 10.
Figure 12:
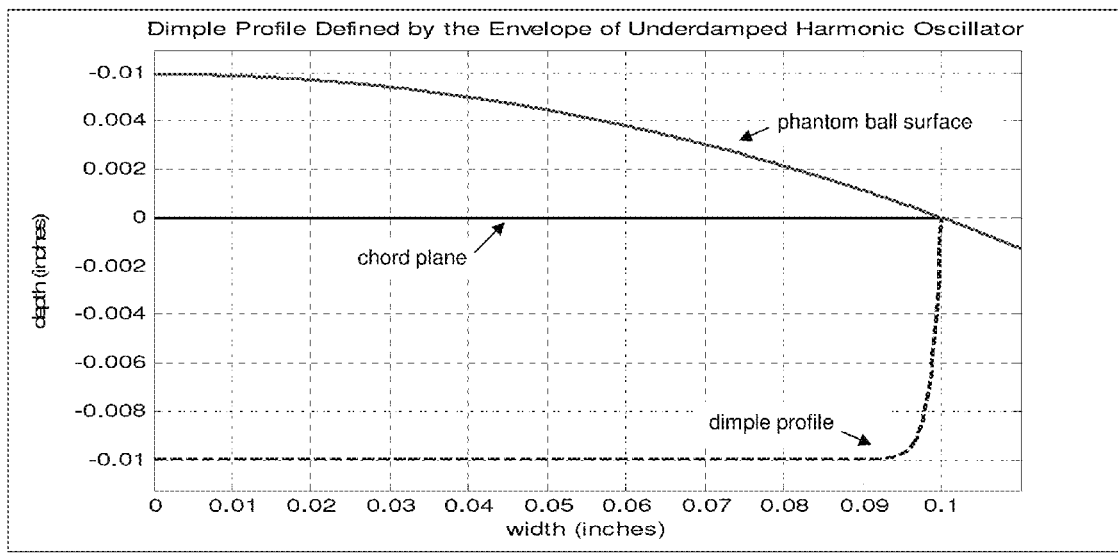
FIG. 12 shows a dimple cross-sectional profile defined using the envelope of oscillation of FIG. 11.

FIGS. 4, 7 and 10 show a response of the system illustrated in FIG. 1, according to various embodiments of the present invention. FIGS. 5, 8 and 11 show the envelope of oscillation of the oscillatory motion of FIGS. 4, 7 and 10, respectively. FIGS. 6, 9 and 12 show a dimple profile defined using the envelope of oscillation of FIGS. 5, 8 and 11, respectively. The profile is then rotated 360° about the vertical axis to define the dimple surface.

Dimple profiles defined using this method can also be characterized by the magnitude of the Fourier Transform of the oscillatory motion described by Equation 1. Fourier transformation is defined by:

$$x_k = x(t_k) + \frac{a_0}{2} + \sum_{i=1}^{N/2}\left(a_i\cos\left(\frac{2\pi t}{T}\right) + b_i\sin\left(\frac{2\pi t}{T}\right)\right),$$ Equation 9

$k = 1, 2, \ldots, N$ where $$a_0 = \frac{1}{N}\sum_{k=1}^{N} x_k,$$ Equation 10

$$a_i = \frac{1}{N}\sum_{K=1}^{N} x_k \cos\left(\frac{2\pi ik}{N}\right), \text{ and}$$ Equation 11

$$b_i = \frac{1}{N}\sum_{K=1}^{N} x_k \sin\left(\frac{2\pi ik}{N}\right).$$ Equation 12

The maximum amplitude, $\alpha_{max}$, of the magnitude of the Fourier Transform of the oscillatory motion that defines the envelope which defines the dimple profile is typically within a range having a lower limit of 0.001 or 0.003 or 0.004 and an upper limit of 10 or 50 or 100.

Figure 13:
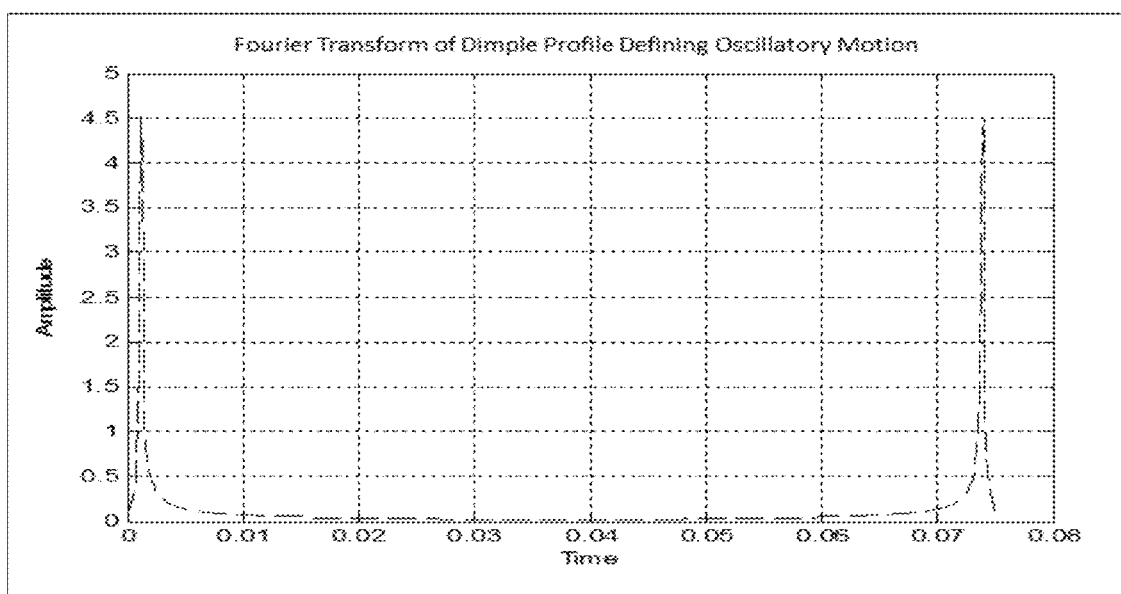
FIG. 13 shows the Fourier Transform of the oscillatory motion of FIG. 4.
Figure 14:
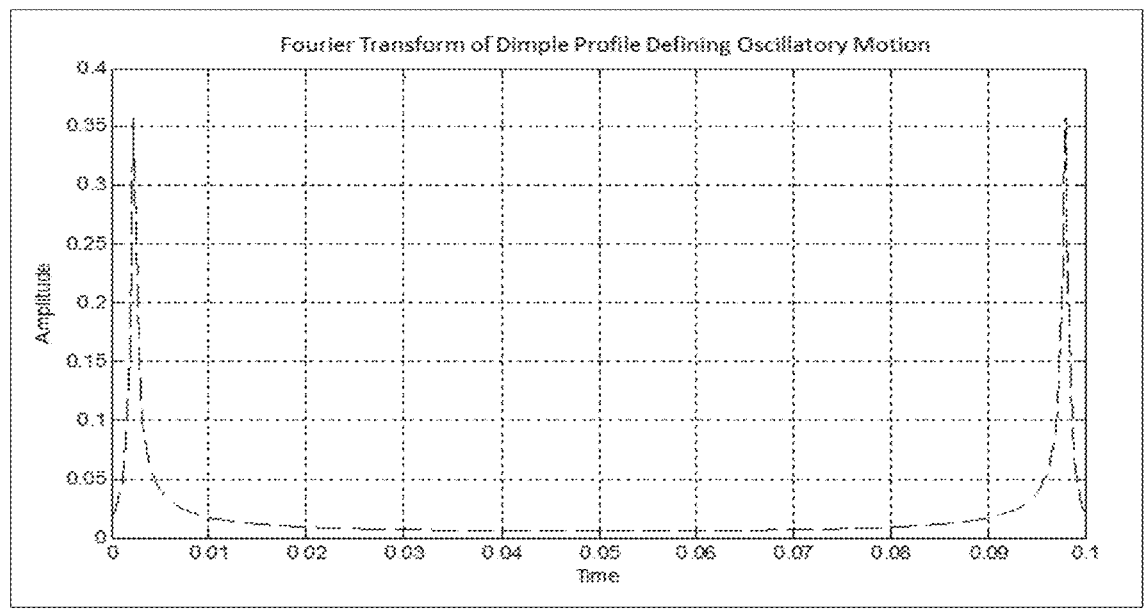
FIG. 14 shows the Fourier Transform of the oscillatory motion of FIG. 7.
Figure 15:
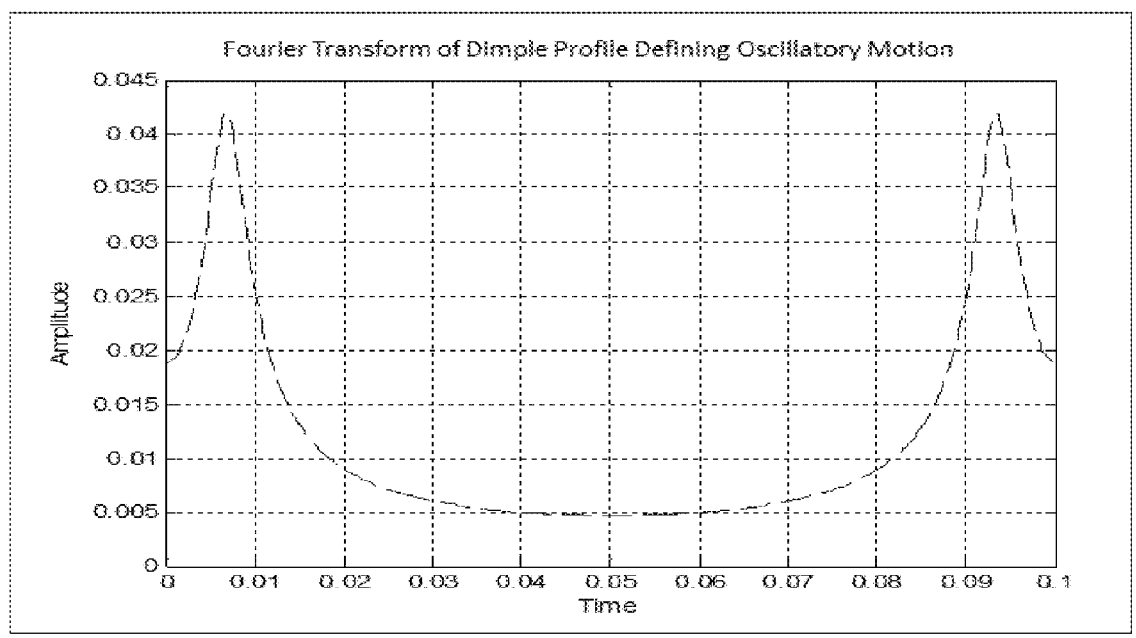
FIG. 15 shows the Fourier Transform of the oscillatory motion of FIG. 10.

FIGS. 13, 14 and 15 show the Fourier Transform of the oscillatory motion of FIGS. 4, 7 and 10, respectively.

Dimples according to the present invention preferably have a dimple diameter within a range having a lower limit of 0.005 inches or 0.020 inches or 0.090 inches or 0.100 inches or 0.115 inches or 0.125 inches and an upper limit of 0.185 inches or 0.200 inches or 0.225 inches or 0.250 inches or 0.300 inches.

The chord depth of dimples of the present invention is typically within a range having a lower limit of 0.001 inches or 0.005 inches or 0.007 inches and an upper limit of 0.010 inches or 0.015 inches or 0.020 inches or 0.030 inches or 0.040 inches.

The dimple volume of dimples of the present invention is typically within a range having a lower limit of $1.351*10^{-8}$ in$^3$ or $1.032*10^{-5}$ in$^3$ and an upper limit of $1.810*10^{-4}$ in$^3$ or 0.0021 in$^3$.

The volume ratio of the dimple, $V_0$ is the fractional ratio of the dimple volume divided by the volume of a cylinder defined by a diameter and chord depth similar to that of the dimple, and is defined by:

$$V_0 = \frac{V}{\pi\left(\frac{d_d}{2}\right)^2 C_d}$$

where V is dimple volume, $C_d$ is the chord depth, and $d_d$ is the dimple diameter. The volume ratio of dimples of the present invention is less than 1, and is typically within a range having a lower limit of 0.001 or 0.01 or 0.02 or 0.03 or 0.05 and an upper limit of 0.70 or 0.80 or 0.90 or 0.96 or 0.99.

The present invention is not limited by any particular dimple pattern. Examples of suitable dimple patterns include, but are not limited to, phyllotaxis-based patterns; polyhedron-based patterns; and patterns based on multiple copies of one or more irregular domain(s) as disclosed in U.S. Pat. No. 8,029,388, the entire disclosure of which is hereby incorporated herein by reference; and particularly dimple patterns suitable for packing dimples on seamless golf balls. Non-limiting examples of suitable dimple patterns are further disclosed in U.S. Pat. Nos. 7,927,234, 7,887,439, 7,503,856, 7,258,632, 7,179,178, 6,969,327, 6,702,696, 6,699,143, 6,533,684, 6,338,684, 5,842,937, 5,562,552, 5,575,477, 5,957,787, 5,249,804, 5,060,953, 4,960,283, and 4,925,193, and U.S. Patent Application Publication Nos. 2006/0025245, 2011/0021292, 2011/0165968, and 2011/0183778, the entire disclosures of which are hereby incorporated herein by reference. Non-limiting examples of seamless golf balls and methods of producing such are further disclosed, for example, in U.S. Pat. Nos. 6,849,007 and 7,422,529, the entire disclosures of which are hereby incorporated herein by reference.

In a particular embodiment, the dimple pattern provides for overall dimple coverage of 60% or greater, or 65% or greater, or 75% or greater, or 80% or greater, or 85% or greater, or 90% or greater.

Golf balls of the present invention typically have a dimple count within a limit having a lower limit of 250 and an upper limit of 350 or 400 or 450 or 500. In a particular embodiment, the dimple count is 252 or 272 or 302 or 312 or 320 or 328 or 332 or 336 or 340 or 352 or 360 or 362 or 364 or 372 or 376 or 384 or 390 or 392 or 432.

Preferably, at least 30%, or at least 50%, or at least 60%, or at least 80%, or at least 90%, or at least 95% of the total number of dimples have a cross-sectional profile based on the envelope of the response of an under damped harmonic oscillator, with the remaining dimples, if any, having a cross-sectional profile based on any known dimple profile shape including, but not limited to, parabolic curves, ellipses, spherical curves, saucer-shapes, sine curves, truncated cones, flattened trapezoids, and catenary curves. Among the dimples having a cross-sectional profile defined by the present invention, the profile of one dimple may be the same as or different from the profile of another dimple. Similarly, among the remaining dimples, if any, having a known dimple profile shape, the profile of one dimple may be the same as or different from the profile of another dimple.

The present invention is not limited by any particular golf ball construction or any particular composition for forming the golf ball layers. For example, functionally weighted curves of the present invention can be used to form dimple profiles on one-piece, two-piece (i.e., a core and a cover), multi-layer (i.e., a core of one or more layers and a cover of one or more layers), and wound golf balls, having a variety of core structures, intermediate layers, covers, and coatings.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A method for defining a golf ball dimple surface, the method comprising:

providing a response of an under damped harmonic oscillator, wherein the response has an envelope of oscillation, OE, described by $$OE(t) = \pm X e^{-\zeta \omega_n t},$$

where $$\zeta = \frac{c}{\sqrt{4mk}},$$

$$\omega_n = \sqrt{\frac{k}{m}},$$

$$X = \frac{[(x_0 \omega_d)^2 + (v_0 + \zeta \omega_n x_0)^2]^{1/2}}{\omega_d},$$

$$\omega_d = \omega_n \sqrt{1 - \zeta^2},$$

and where t is observation time, v is velocity, m is mass, k is the spring constant, c is the viscous damping coefficient;

defining a golf ball dimple profile based on the envelope of oscillation where the observation time is equal to one half of the dimple diameter; and rotating the dimple profile 360° about a vertical axis to define the dimple surface.

2. A golf ball having a plurality of recessed dimples on the surface thereof, wherein at least a portion of the recessed dimples have a surface defined according to the method of claim 1.

* * * * *